Figure 1:
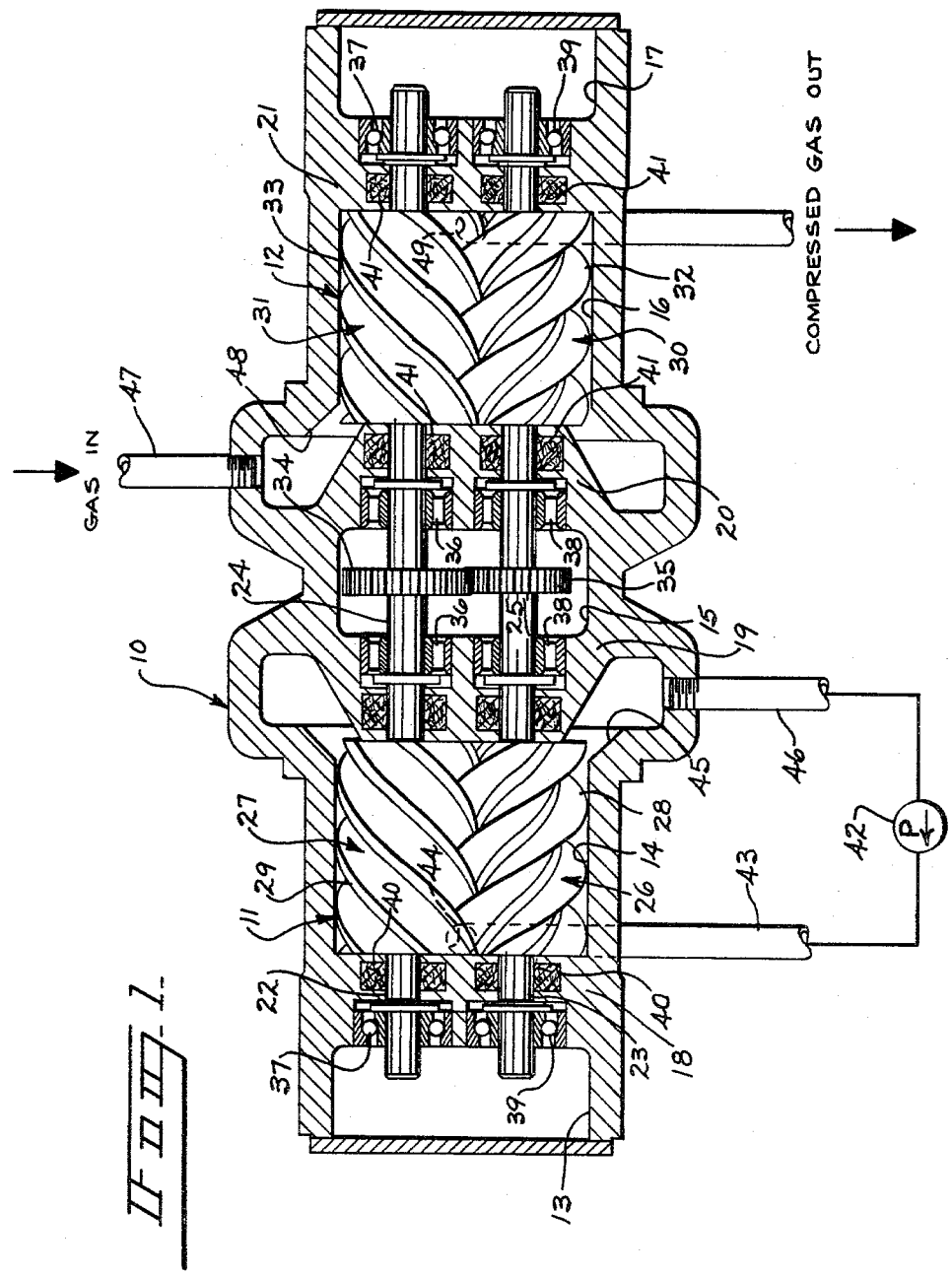

May 18, 1965

W. R. CROOKS 3,184,155

MOTOR COMPRESSOR UNIT

Filed April 17, 1963

2 Sheets-Sheet 1

INVENTOR.
WILLIAM R. CROOKS
BY
ATTORNEYS

United States Patent Office 3,184,155
Patented May 18, 1965

3,184,155
MOTOR COMPRESSOR UNIT
William R. Crooks, Mount Vernon, Ohio, assignor to The Cooper-Bessemer Corporation, Mount Vernon, Ohio, a corporation of Ohio
Filed Apr. 17, 1963, Ser. No. 273,686
3 Claims. (Cl. 230—139)

The present invention relates to compressors of the helical axial flow screw type, and more particularly to a unit comprising a helical axial flow screw type compressor driven by a helical axial flow screw type hydraulic motor, and which unit is particularly suited for compressing gases to very high pressures ranging from 15,000 to 100,000 pounds per square inch.

Conventional reciprocating compressor equipment can be reliably and economically operated at discharge pressures in the 15,00 to 20,000 pounds per square inch range. At pressures between 20,000 pounds per square inch and 100,000 pounds per square inch, however, packing blow-by becomes excessive, and difficulty is experienced with leakage past the inlet and discharge valving. In addition, the pulsating load due to the reciprocating nature of the structure causes fatigue failures in the regions of stress concentration around the valve pockets and similar discontinuities in the castings.

The primary object of the invention is to provide a multi-stage motor-compressor unit in which the forces acting axially are substantially balanced.

Another object of the present invention is the provision of a new and improved compressor whose drive shaft seals are subjected to a minimum of pressure drop and therefor minimum leakage.

Another object of the invention is the provision of a new and improved screw compressor and hydraulic actuating motor which are housed within a single casing so as to avoid external pressure seals around the drive shaft of the compressor and hydraulic motor.

Another object of the invention is the provision of a combined unit of the immediately above described type in which the discharge end of the hydraulic motor is adjacent the suction end of the compressor and the adjacent ends of the motor and compressor are operated at substantially the same pressure so that substantially no pressure differential exists across the shaft seals separating the motor and compressor.

A further object of the invention is the provision of a combined unit of the immediately above described type in which the axial forces on the motor are substantially equal and opposite to those on the compressor such that very little axial force must be absorbed by thrust bearings.

Figure 2:
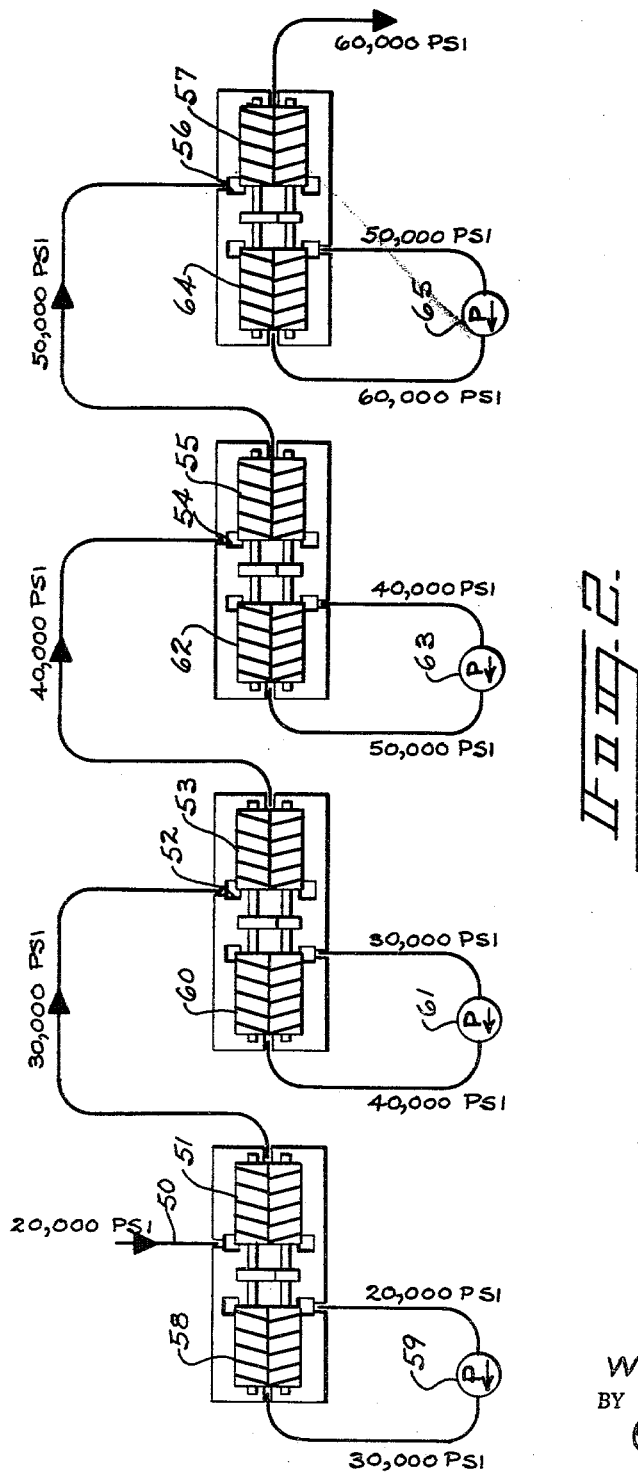

The invention resides in certain constructions, and combinations and arrangements of parts, and further objects and advantages of the invention will become apparent to those skilled in the art to which the invention relates from the following description of the preferred embodiment described with reference to the accompanying drawing forming a part of this specification, and in which:

FIGURE 1 is a somewhat diagrammatic sectional view of a unit comprising a helical screw type compressor driven by a helical screw type motor and which unit embodies the present invention; and FIGURE 2 is a diagrammatic view showing a plurality of the units of FIGURE 1 arranged in series to produce very high discharge pressures.

The comibnation motor and compressor unit shown in FIGURE 1 of the drawings comprises a unitary casing 10 in which both a motor 11 and a compressor 12 are situated. The motor 11 and compressor 12 may each be of any suitable axial flow type. The compressor 12 may also be of any suitable screw type, as for example the type known as a "lysholm" compressor, and is preferably of the type shown and described in the Whitfield Patent 2,287,716. The motor 11 utilizes hydraulic pressure fluid for its motive power, and may be of any suitable screw type, such as the well known Moyno device, but is also preferably of the type shown in the Whitfield patent.

The casing 10 comprises two half sections which bolt together to form a bearing chamber 13, a pumping chamber 14, a gear chamber 15, a compressor chamber 16, and another bearing chamber 17, spaced apart in that order. The bearing and pumping chambers 13 and 14 are separated by a partition 18, the pumping and gear chambers 14 and 15 are separated by a partition 19, the gear and compressor chambers 15 and 16 are separated by a partition 20 and the compressor and bearing chambers 16 and 17 are separated by a partition 21.

Two sets 22 and 23 of aligned shaft openings are arranged side by side through each of the partitions to receive longitudinally extending shafts 24 and 25 respectively. A helical motor rotor 26 of the Whitfield type is mounted on the shaft 25 in the pumping chamber 14, and a mating helical gate 27 is carried by the shaft 24 in the pumping chamber 14. The rotor and gate may have any number of thread like lobes thereon; and in the preferred embodiment, the rotor 26 has four lobes 28 and the gate 27 has six lobes 29. A compressor rotor 30 is mounted on the shaft 25 in the compressor chamber 16, and a mating compressor gate 31 is mounted on the shaft 24 in the compressor chamber 16. The rotor 30 has four lobes 32 and the gate 31 has six lobes 33. In some instances there may be direct mechanical engagement between the lobes of the rotors and gates of the motor and compressor; but in order to eliminate wear of the rotors and gates, meshing, timing and drawing gears 34 and 35 are provided on the shafts 24 and 25 respectively to keep the lobes of the rotors and gates from contacting each other.

The shaft 24 is journalled by a pair of roller bearings 36 in the center partitions 19 and 20 on opposite sides of the gear 34, and by a pair of ball thrust bearings 37 in the outer partitions 18 and 21 at opposite ends of the shaft. The shaft 25 is similarly supported by a pair of roller bearings 38 in the center partitions 19 and 20, and by a pair of ball thrust bearings 39 in the outer partitions 18 and 21. The thrust bearings 37 and 39 are so arranged as to prevent endwise movement of the shafts 24 and 25 in either direction.

In order to prevent leakage of fluid out of the pumping chamber 14 around the shafts 24 and 25, shaft seals 40 are provided in the partitions 18 and 19 around each of the shafts. Similarly, to prevent leakage out of the compressor chamber 16 around the shafts 24 and 25, shaft seals 41 are provided in the partitions 20 and 21 around each of the shafts.

Motive power for the motor 11 is supplied by hydraulic pressure from an external pump 42. Discharge pressure from the pump 42 passes through a pressure discharge line 43 to the pressure inlet 44 of the motor adjacent the left side of the motor chamber 14. Discharge fluid from the motor 11 passes out through a crescent shaped discharge port 45 at the right hand side of the motor chamber 14 and is communicated back to the pump 42 through suction line 46. The pressure drop across the lobes of the gate and rotor of the motor causes the shafts 24 and 25 to be revolved in the manner indicated by the arrows at the left side of FIGURE 1.

Rotation of the shafts 24 and 25 causes gases to be trapped between the lobes of the rotor 30 and gate 31 of the compressor 12. Gases enter through a suction line 47 and crescent shaped inlet port 48 at the bottom of the left side of the compressor chamber 16 and are discharged through a discharge port 49 adjacent the top right hand side of the compressor chamber 16.

According to the invention, the pressure in the adjacent ends of the motor chamber 14 and the compressor chamber 16 are substantially the same, so that the adjacent seals 40 and 41 are not subjected to large differential pressures even though the absolute pressure in the compressor and motor chambers is large. Inasmuch as the bearing chambers 13 and 17 are completely enclosed, these chambers become pressurized and the seals 40 and 41 in the outer partitions 18 and 21 are thereafter subjected to substantially no differential pressure. It will, therefore, be seen that the present invention provides an arrangement which overcomes difficult sealing problems.

A further advantage of the present invention is realized by introducing high pressure into the outer or left hand side of the motor chamber 14 to produce a pressure force tending to move the shafts 24 and 25 to the right while low pressure enters the left side of the compressor chamber 16 and high pressure discharges from the right hand side of the compressor chamber 16 so that the axial forces on the shafts 24 and 25 are substantially balanced.

FIGURE 2 of the drawings shows an arrangement whereby several of the motor compressor units shown in FIGURE 1 can be used to develop exceedingly high gas pressures. Gas pressure at any suitable pressure can be communicated to the suction line 50 of a first stage compressor 51. Gases can be boosted economically in reciprocating compressors to around 20,000 p.s.i. so that it is quite convenient to introduce gases to the compressor at this pressure. The pressure is raised to 30,000 p.s.i. in the compressor 51 and is then communicated to the suction line 25 of the compressor 53. Compressor 53 boosts the pressure to 40,000 p.s.i, and this pressure is then communicated to the suction 54 of compressor 55. Compressor 55 boosts the pressure to 50,000 p.s.i. and discharges this pressure to the suction 56 of compressor 57. Compressor 57 boosts the gases to a discharge pressure of 60,000 p.s.i.

The first stage compressor 51 is driven by a hydraulic motor 58, which receives pressure at approximately 30,000 p.s.i. from a pump 59 and discharges it back to the pump 59 at 20,000 p.s.i. The second stage compressor 53 is driven by a hydraulic motor 60 which receives pressure at approximately 40,00 p.s.i. from a pump 61 and discharges it back to the pump 61 at 30,000 p.s.i. The third stage compressor 55 is driven by a hydraulic motor 62 which receives pressure at approximately 50,000 p.s.i. from a pump 63 and discharges it back to the pump 63 at 40,000 p.s.i. The fourth stage compressor 57 is driven by a hydraulic motor 64 which receives pressure at approximately 60,000 p.s.i. from a pump 65 and discharges it back to the pump 65 at 50,000 p.s.i.

With this multi-stage system, each compressor stage is driven by its own motor, and each is balanced individually. The sealing problems encountered are thus broken down to the several units and eliminated as above described with reference to FIGURE 1, by setting the drawing pressures from the pumps 59, 61, 63 and 65 to coincide with the suction and discharge pressures of the associated compressor stages.

It will therefore be seen that the objects heretofore enumerated as well as others have been accomplished and that there has been provided a compressor arrangement which avoids external shaft seals which must hold the full discharge pressure of the compressor, and further that the arrangement substantially balances axial forces on the drive shaft of the unit so that very little thrust is absorbed in thrust bearings.

While the invention has been described in considerable detail, I do not wish to be limited to the particular embodiment shown and described; and it is my intention to cover hereby all novel adaptations, modifications, and arrangements thereof which come within the practice of those skilled in the art to which the invention relates.

What I claim is:

1. In a combination motor and high pressure fluid pumping device: a housing having a motor chamber and a pumping chamber spaced apart in end to end relationship therein, a pair of shafts extending longitudinally through both of said motor and pumping chambers, said shafts being totally confined within said housing with no external mechanical connections, a first pair of meshing generally helical axial flow screw type rotor members in said motor chamber with respective ones of said rotor members on respective ones of said shafts, a second pair of meshing generally helical axial flow screw type rotor members in said pumping chamber with respective ones of said rotor members on respective ones of said shafts, means supplying high pressure hydraulic fluid adjacent a first end of said meshing helical screw type rotor members of said motor chamber and removing lower pressure from the opposite end of said meshing helical screw type rotor members of said motor chamber, means supplying low pressure fluid adjacent a first end of said meshing helical screw type rotor members of said pumping chamber and discharging high pressure fluid at the opposite end of said meshing helical screw type rotor members of said pumping chamber, said first end of said pumping chamber lying in the same direction relative to its opposite end as does the first end of said motor chamber relative to its opposite end, and said motor rotor members and pump rotor members being sized relative to each other such that all of the torque developed by said motor rotor members is used to drive said pump rotor members.

2. In a combination motor and high pressure compressor: a housing having a motor chamber and a compresser chamber spaced apart in end to end relationship therein, a pair of shafts extending longitudinally through both of said motor and compressor chambers, said shafts being totally confined within said housing with no external mechanical connections, a pair of meshing generally helical axial flow hydraulic screw type motor rotors in said motor chamber with respective ones of said rotors on respective ones of said shafts, a pair of meshing generally helical axial flow screw type compressor rotors in said compressor chamber with respective ones of said compressor rotors on respective ones of said shafts, means supplying high pressure hydraulic fluid adjacent a first end of said meshing helical screw type motor rotors and removing lower pressure fluid from the opposite end of said meshing helical screw type motor rotors, means supplying low pressure gases adjacent a first end of said meshing helical screw type compressor rotors and discharging high pressure fluid at the opposite end of said meshing helical screw type compressor rotors, said first end of said compressor rotors lying in the same direction relative to the opposite end of said compressor rotors as does the first end of said motor rotors relative to the opposite end of said motor rotors, and said motor rotors and compressor rotors being sized relative to each other such that all of the torque developed by said motor rotors is used to drive said compressor rotors.

3. In a combination motor and high pressure compressor: a housing having a motor chamber and a compressor chamber spaced apart in end to end relationship therein, a pair of shafts extending longitudinally through both of said motor and compressor chambers, said shafts being totally confined within said housing with no external mechanical connections, a pair of meshing generally helical axial flow hydraulic screw type motor rotors in said motor chamber with respective ones of said rotors on respective ones of said shafts, a pair of meshing generally helical axial flow screw type compressor rotors in said compressor chamber with respective ones of said compressor rotors on respective ones of said shafts, means supplying high pressure hydraulic fluid at a first generally predetermined pressure adjacent a first end of said meshing helical screw type motor rotors, and removing pressure from the opposite end of said meshing helical screw type motor rotors at a second generally predetermined pressure, means supplying low pressure gases adjacent a first end of said meshing helical screw type compressor rotors at said generally second predetermined pressure and discharging pressure fluid at the opposite end of said meshing helical screw type compressor rotors at said first generally predetermined pressure, said first end of said compressor rotors lying in the same direction relative to the opposite end of said compressor rotors as does the first end of said motor rotors relative to the opposite end of said motor rotors, and said motor rotors and compressor rotors being sized relative to each other such that all of the torque developed by said motor rotors is used to drive said compressor rotors.

References Cited by the Examiner

UNITED STATES PATENTS

| | | |
|---|---|---|
| 1,930,403 | 10/33 | Van der Does de Bije __ 230—143 |
| 2,804,260 | 8/57 | Nilsson et al. _____ 230—139 |

FOREIGN PATENTS

| | | |
|---|---|---|
| 464,475 | 4/27 | Great Britain. |

LAURENCE V. EFNER, *Primary Examiner.*

ROBERT M. WALKER, *Examiner.*